United States Patent [19]
Liles et al.

[11] Patent Number: 5,502,107
[45] Date of Patent: Mar. 26, 1996

[54] POLYSTYRENE MODIFIED WITH A TELECHELIC POLYORGANOSILOXANE

[75] Inventors: Donald T. Liles, Midland; Kenneth M. Lee, Bay City; David L. Murray, Midland, all of Mich.

[73] Assignee: Dow Corning Corporation, Midland, Mich.

[21] Appl. No.: 269,239

[22] Filed: Jun. 30, 1994

[51] Int. Cl.[6] ................................. C08F 283/12
[52] U.S. Cl. .................. 525/63; 525/106; 525/479; 528/25; 528/34
[58] Field of Search ............... 525/63, 106, 479; 528/25, 34

[56] References Cited

U.S. PATENT DOCUMENTS

| | | | |
|---|---|---|---|
| 2,891,920 | 6/1959 | Hyde/Wehrly | 260/29.2 |
| 3,294,725 | 12/1966 | Findlay/Weyenberg | 260/29.2 |
| 4,273,634 | 6/1981 | Saam et al. | 204/159.15 |
| 4,370,160 | 1/1983 | Ziemelis | 71/117 |
| 4,618,642 | 10/1986 | Schoenherr | 524/425 |
| 4,690,986 | 9/1987 | Sasaki et al. | 525/479 |
| 4,782,112 | 11/1988 | Kondo et al. | 524/837 |
| 4,939,205 | 7/1990 | Derudder et al. | 525/63 |
| 4,939,206 | 7/1990 | Wang | 525/63 |
| 4,954,565 | 9/1990 | Liles | 524/860 |
| 5,047,472 | 9/1991 | Alsamarraie et al. | 525/68 |
| 5,084,489 | 1/1992 | Liles | 522/84 |
| 5,089,537 | 2/1992 | Liles | 522/84 |

*Primary Examiner*—Ralph H. Dean
*Attorney, Agent, or Firm*—Richard I. Gearhart

[57] ABSTRACT

A crumb-like silicone rubber powder is uniformly dispersed in a polystyrene polymer using conventional equipment, such as a twin screw extruder, to provide a resin having up to a ten fold improvement in impact strength over the unmodified polymer. The novel silicone rubber powder of the invention is prepared by isolating the particles obtained from a polymerization of an unsaturated monomer in the presence of an aqueous emulsion of a unsaturated telechelic polydiorganosiloxane which has been prepared using an organotin curing catalyst and a dihydrolyzable grafting silane.

34 Claims, No Drawings

POLYSTYRENE MODIFIED WITH A TELECHELIC POLYORGANOSILOXANE

FIELD OF THE INVENTION

The present invention relates to polystyrene polymer compositions having high impact strength. More particularly, the invention relates to polystyrene polymers which are modified with a silicone crumb rubber prepared by polymerizing an unsaturated monomer in the presence of an aqueous emulsion of a non-crosslinked, telechelic polydiorganosiloxane.

BACKGROUND OF THE INVENTION

Polystyrene (PS) is one of the largest volume thermoplastic resins in commercial production today. This ubiquitous material is well suited to many "low performance" applications wherein its brittle nature is of little consequence. Additionally, many other applications requiring greater impact resistance have been uncovered by the advent of various modifications of these plastics. Thus, styrene-based copolymers, and particularly PS resins which are modified with organic rubber particles, have been a commercially viable alternative to some of the more exotic and expensive engineering plastics for certain applications.

One such system, known in the art as high impact polystyrene (HIPS), can have an impact strength which is an order of magnitude greater than the virgin resin but suffers from poor thermal stability, particularly in the presence of oxygen. These modified PS resins are typically prepared by polymerizing a solution of an unsaturated organic rubber, such as polybutadiene, in styrene monomer.

The addition of various rubber compositions to other thermoplastic resin systems has also proved beneficial. For example, Japanese Kokai Patent Application No. Hei 2(1990)-263861 to Mitsubishi Rayon Co., Ltd. discloses a thermoplastic resin composition having a high impact strength, high heat resistance and good resistance to organic solvents. This composition comprises a blend of polyphenylene ether (PPE) resin, a polyester resin and a rubber-like elastomer and/or modified rubber-like elastomer. A preferred elastomer component of this prior art disclosure is obtained by the graft copolymerization of at least one vinyl monomer with a composite rubber consisting of a silicone rubber and a polyalkyl methacrylate interlocked with each other. In the production of the composite rubber component, a cyclic diorganosiloxane is emulsion polymerized with a crosslinker and, optionally, with a graft crosslinking agent using a sulfonic-acid-series emulsifying agent. In a subsequent step, a combination of an alkyl (meth)acrylate, a crosslinker and a graft crosslinking agent is used to swell the silicone particles of the above emulsion and an initiator is then introduced to polymerize this system.

In a similar approach, Alsamarraie et al. U.S. Pat. No. 5,047,472 teaches thermoplastic molding compositions comprising PPE resin, or a PPE resin containing a polystyrene resin, which is modified with a multi-stage polyorganosiloxane/vinyl-based graft polymer. These compositions are stated to have improved impact resistance, flame resistance and moldability. In this case, the graft copolymer is prepared by a "co-homopolymerization" technique wherein an emulsion containing a diorganosiloxane, a crosslinker and a graft-linker is polymerized concurrently with the polymerization of a vinyl monomer. The resulting first stage polymeric co-homopolymerized substrate is then grafted with a vinyl polymer in at least one subsequent stage. This multi-stage polydiorganosiloxane polyorganosiloxane/vinyl-based graft polymer formed according to the methods described by Alsamarraie et al. was also employed by Derudder et al. in U.S. Pat. No. 4,939,205 to augment the impact resistance of polycarbonate resin compositions. The graft polymer was further used by Wang in U.S. Pat. No. 4,939,206 to modify various thermoplastic resins with the object of providing flame retardant compositions having improved impact resistance.

Sasaki et al. U.S. Pat. No. 4,690,986 teaches a polydiorganosiloxane/polystyrene copolymer. However, Sasaki et al. is distinguishable from the present invention in several significant respects. Sasaki teaches that crosslinking occurs between the polydiorganosiloxane molecules during an emulsion polymerization. The Sasaki method teaches that the grafting polymer attaches to the polydiorganosiloxane during the emulsion polymerization at the same time as the formation of crosslinks between the polydiorganosiloxane molecules. Further, the crosslinking and attachment of the grafting polymer occurs randomly in Sasaki. As a result, neither the molecular weight nor the crosslinking density of the polydiorganosiloxane can be controlled. The resulting polydiorganosiloxane is a crumb rubber which is difficult to process during the copolymerization steps. Crumb rubbers are virtually impossible to characterize, for example, in terms of measuring their molecular weights.

In contrast, the present invention teaches that the grafting polymer is attached to an end-capped polydiorganosiloxane during a condensation reaction in the presence of a tin catalyst. The attachment of the grafting group does not occur randomly on the polydiorganosiloxane during an emulsion polymerization, but instead attaches specifically at the two the end-groups of the polydiorganosiloxane molecules. Because it is not crosslinked, the polydiorganosiloxane of the present invention is in the form of a gum and not an elastomer upon removal of water from the emulsion. The gum is easy to characterize, i.e., the molecular weight of the gum can be readily measured by gel permeation chromatography. Upon copolymerizing the telechelic polydiorganosiloxane emulsion with styrene monomer, and removing the water, the composition of the present invention has the consistency of a crumb rubber.

SUMMARY OF THE INVENTION

The present invention therefore relates to a composition comprising:

(A) a polystyrene polymer; and (B) a silicone crumb rubber powder uniformly dispersed in said polystyrene polymer, said silicone crumb rubber prepared by the steps comprising:

(I) reacting a preformed aqueous polydiorganosiloxane emulsion comprising water, a surfactant, and a plurality of silanol-terminated polydiorganosiloxane molecules, with a grafting silane in the presence of an organotin catalyst to form a telechelic emulsion polymer, wherein said grafting silane has the formula:

$$RQSi(X)_2$$

where

X is a hydrolyzable group,

Q is an unsaturated organic functional group,

R is Q, or a saturated monovalent hydrocarbon group of from one to six carbon atoms, and (II) thereafter co-polymerizing an unsaturated monomer with said telechelic emulsion polymer formed in step (I) to form particles therefrom; and (III) recovering the particles resulting from step (II), said composition containing from 5 to 50 parts by weight of said polydiorganosiloxane for each 100 parts by weight of said polystyrene polymer.

The polydiorganosiloxane emulsion of step (I) is prepared using conventional methods. A grafting silane is then reacted with the polydiorganosiloxane in emulsion via a condensation reaction which takes place in the presence of a tin catalyst. The grafting silane replaces the silanol groups on the ends of the polydiorganosiloxane molecules to produce an emulsion of a non-crosslinked telechelic polydiorganosiloxane. A telechelic molecule is herein defined as a polydiorganosiloxane molecule with organic functional groups disposed at the polymer chain ends, which can be used to bond chemically to other types of molecules. No crosslinking occurs during formation of the telechelic polydiorganosiloxane emulsion. This is in contrast to the grafting silanes selected in the prior art, in which the three hydrolyzable groups at the silicon atom of the grafting silanes condense with silanols of other polydiorganosiloxane molecules to produce a crosslinked polyorganosiloxane, or an emulsion of silicone rubber. The non-crosslinked telechelic polyorganosiloxanes of the present invention therefore have the physical characteristics of a gum upon removal of water from the emulsion. The process of grafting the silane to the preformed aqueous emulsion polymer having a plurality of silanol-terminated polydiorganosiloxane particles is further described in U.S. patent application Ser. No. 08/268,349 titled "FUNCTIONAL POLYORGANOSILOXANE EMULSIONS FROM DIHYDROLYZABLE SILANES AND PHOTOCURABLE COMPOSITIONS THEREFROM", filed contemporaneously with this application.

In steps (II) and (III), the non-crosslinked telechelic polydiorganosiloxanes are copolymerized with a monomer such as styrene, then recovered to form a crumb rubber powder by separating the water from the polymer particles. The crumb rubber may be added to the polystyrene polymer to improve the physical characteristics of the polystyrene polymer.

This invention is an improvement over the prior art, since the starting polydimethylsiloxane emulsion is not pre-cured. The gum nature of the non-crosslinked telechelic polydiorganosiloxanes allow for optimization of the molecular weight, i.e. the characterization of the polydimethylsiloxane prior to addition of the unsaturated monomer.

Polystyrene resins modified with the silicone gums of the present invention exhibit up to a ten-fold improvement in impact resistance over the virgin polystyrene. The crumb rubber powders of the present invention are also readily dispersible in the polystyrene resins using conventional process equipment, such as a twin screw extruder. This offers a significant advantage to a plastics manufacturer since both resin and modifying crumb rubber powder can be handled as particulate solid feeds and are therefore amenable to facile introduction to mixing equipment (e.g., from a hopper). These crumb rubber powders can also be formulated as a "master batch" and used as a concentrate to further modify styrenic plastics.

DETAILED DESCRIPTION OF THE INVENTION

The polystyrene (PS) polymer (A) of the present invention is well known in the art and is a homopolymer or copolymer prepared from styrenic monomers. For the purposes of the present invention, styrenic monomers are substituted or unsubstituted versions of the basic structure

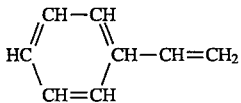

Examples of such monomers are styrene, alpha-methylstyrene, chloromethylstyrene, and divinyl benzene, inter alia. These monomers are well known in the art and further description thereof is not considered necessary, the interested reader being referred to pages 1–246 of volume 16 of the "Encyclopedia of Polymer Science and Engineering" published by John Wiley & Sons (1989).

Atactic polystyrene is the most commercially significant PS type and is a preferred component (A). It is, however, also contemplated that the less prevalent syndiotactic and isotactic polystyrene homopolymers, as well as copolymers of styrene with such monomers as acrylates, acrylonitrile and butadiene, also derive significant benefit from modification according to the present invention, which copolymers are considered by the inventors herein to fall within the meaning of "a polystyrene polymer".

Component (B) is a silicone crumb rubber which is prepared by recovering polydiorganosiloxane emulsion particles from water, such particles having an unsaturated monomer copolymerized therewith. This component is prepared by the following sequence.

First, an aqueous silicone emulsion (I) of a silanol-terminated polydiorganosiloxane is prepared by methods well known in the art. In addition to the polydiorganosiloxane and water, component (I) also contains at least one surfactant which stabilizes the dispersed polydiorganosiloxane and molecules and/or particles in the emulsion. In order to achieve the intended impact modification characteristics, described infra, the polydiorganosiloxane particles of this emulsion should have an average size of about 0.1 to about 10 microns, preferably from about 0.5 to about 1 micron and be characterized by a weight average molecular weight of greater than about 50,000, preferably greater than 100,000. It is preferred that the above described emulsion have a solids content ranging from about 20 to about 70 weight percent, most preferably about 65%.

These emulsions are well known in the art and may be prepared, for example, by methods wherein cyclic or linear diorganosiloxane species are dispersed in an aqueous continuous phase with the aid of the above mentioned surfactant and are thereafter emulsion polymerized by the introduction of an acid or base catalyst. These methods can be illustrated by the disclosures of Findlay et al. U.S. Pat. No. 3,294,725 and Hyde et al. U.S. Pat. No. 2,891,920, among others. In preferred embodiments of emulsion (I), the surfactant employed is an anionic type, such as sodium lauryl sulfate or ammonium lauryl sulfate, and the catalyst is dodecylbenenzene sulfonic acid, the latter also acting as a surfactant in the system. The hydroxyl terminated polydiorganosiloxane emulsion can also be prepared by direct emulsification. In this process, a mixture of water, polydiorganosiloxane and one or more surfactants is processed under high shear conditions using either conventional mixing equipment or high shear devices such as a homogenizer. Methods for preparing polymer emulsions are also given in Vanderhoff, et al. U.S. Pat. No. 4,177,177, which is hereby incorporated by reference.

For the purposes of the present invention, the organic groups of the polydiorganosiloxane of emulsion (I) are independently selected from hydrocarbon or halogenated hydrocarbon radicals such as alkyl and substituted alkyl radicals containing from 1 to 20 carbon atoms; cycloalkyl radicals, such as cyclohexyl; and aromatic hydrocarbon radicals, such as phenyl, benzyl and tolyl. Preferred organic groups are lower alkyl radicals containing from 1 to 4 carbon atoms, phenyl, and halogen-substituted alkyl such as 3,3,3-trifluoropropyl. Thus, the polydiorganosiloxane can be a homopolymer, a copolymer or a terpolymer containing such organic groups. Examples include systems comprising dimethylsiloxy units and phenylmethylsiloxy units; dimethylsiloxy units and diphenylsiloxy units; and dimethylsiloxy units, diphenylsiloxy units, methyl 3,3,3-trifluoropropyl units and phenylmethylsiloxy units, among others. Most preferably, the polydiorganosiloxane is a polydimethylsiloxane which is terminated with a hydroxyl groups.

In step (I) an organotin curing catalyst and a grafting silane are added to the above described aqueous emulsion. The grafting silane migrates into the particles of the polydiorganosiloxane emulsion and adds to the silanol functional polymer chain ends, via a condensation reaction which takes place in the presence of the tin catalyst. The grafting silane replaces the silanol groups on the ends of the polydiorganosiloxane molecules to produce a non-crosslinked telechelic polydiorganosiloxane. A telechelic molecule is here defined as a polydiorganosiloxane molecule with functional organic groups disposed at the chain ends. No crosslinking occurs during formation of the telechelic polydiorganosiloxane emulsion. This is in contrast to the grafting silanes selected in the prior art, in which the three hydrolyzable groups at the silicon atom of the grafting silanes condense with silanols of other polydiorganosiloxane molecules to produce a crosslinked polydiorganosiloxane, or an emulsion of silicone rubber. The non-crosslinked telechelic polydiorganosiloxanes of the present invention therefore have the physical characteristics of a gum upon removal of water from the emulsion.

The organotin curing catalyst (II) is an organic salt of tin and may be illustrated by tin (II) carboxylates, such as stannous oleate and stannous naphthanate; dialkyl tin (IV) carboxylates, such as dibutyltin diacetate and dibutyltin dilaurate; and tin (IV) stannoxanes, as exemplified by the structure (Bu)$_2$SnCl—O—(Bu)$_2$OH, in which Bu denotes a butyl radical, as taught by Stein et al. in U.S. Pat. No. 5,034,455. In preferred embodiments, catalyst is stannous octoate.

Preferably, the grafting silane is a silane having the general formula:

RQSi(X)$_2$ and partial hydrolysis condensation products thereof, wherein X is a hydrolyzable group selected from the group consisting of alkoxy radicals having 1 to 6 carbon atoms, chloro, hydrido, acetoxy, diorganoamino, oximato and amido groups and in which Q represents a monovalent radical which contains an unsaturated group.

R is Q, or a saturated monovalent hydrocarbon group of from one to six carbon atoms.

In a more preferred embodiment the grafting silane is:

R'Q'Si(OR')$_2$ in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula HCl·ZN—CH$_2$CH$_2$—N—CH$_2$CH$_2$CH$_2$— and a group  of the formula HCl·ZN(H)—CH$_2$CH$_2$—N(H)—CH$_2$CH$_2$CH$_2$—, wherein Z is

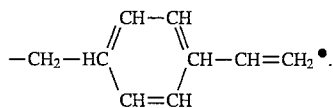

Specific examples of suitable silane include gammaacryloxypropylmethyldimethoxysilane, gammamethacryloxypropylmethyldiethoxysilane, vinylmethyldimethoxysilane, 5-hexenylmethyldimethoxysilane, allylmethyldimethoxysilane, acrylamidopropylmethyldimethoxysilane, and silanes represented by the formulas HCl·ZHN—CH$_2$CH$_2$—NZ—CH$_2$ CH$_2$CH$_2$—SiCH$_3$(OCH$_3$)$_2$ and HCl·ZN(H)—CH$_2$CH$_2$—N(H)—CH$_2$CH$_2$ CH$_2$—SiCH$_3$(OCH$_3$)$_2$, wherein Me hereinafter denotes a methyl radical and Z is a vinylbenzyl group having the formula

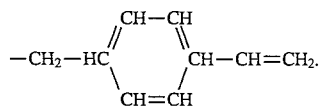

Although order of addition in this second step is not considered critical, it is preferred to first add from about 0.05 to about 2 parts by weight, preferably from about 0.3 to about 0.6 parts, of the catalyst to 100 parts by weight of the hydroxyl-terminated polydiorganosiloxane in emulsion (I). From about 0.1 to about 10 parts by weight, preferably about 1 part, of the grafting silane is then added to this mixture for each 100 parts by weight of the polydiorganosiloxane and the resultant emulsion is allowed to age to complete the endcapping reaction. When the grafting silane content is less than about 0.1 part, incomplete endcapping occurs; when this component exceeds about 10 parts, the byproducts formed when the hydrolyzable group X is reacted can destabilize the emulsion. During the aging process, which can take place at room temperature as well as at elevated temperatures, the Ph of the emulsion should be maintained between about 4 and 10.5. Usually two to four hours at room temperature is sufficient to complete the end-capping process.

Further details regarding the above steps used to prepare the silicone gum of the invention may be found in previously cited Schoenherr U.S. Pat. No. 4,618,642 and Liles U.S. Pat. No. 4,954,565, which patents teach systems in combination with fillers for use as elastomeric coatings. The disclosures of these patents are hereby incorporated by reference to teach the above emulsions and their preparation.

In a second step, at least one unsaturated monomer (II) is polymerized in the presence of the emulsion of non-crosslinked end-capped polydiorganosiloxane particles formed in the second step. The unsaturated groups of this monomer must be capable of reacting with the unsaturated groups of the silane (II). Further, the monomer (II) is selected such that, when it is homopolymerized using a conventional free-radical initiator, it results in a polymer having a glass transition temperature of at least 0° C. Preferably, component (II) is a styrenic monomer of the type described in connection with component (A). Examples of other suitable unsaturated monomers include acrylates, such as methyl acrylate, acrylonitrile and vinyl acetate.

In a preferred procedure for the second step, a free-radical initiator is added to the emulsion resulting from the above described step and at least one unsaturated monomer, preferably a styrenic monomer, is gradually introduced. The preferred styrenic monomer is of the same type described above for use in the manufacture of component (A) and is compatible therewith. Most preferably, it is chemically identical to the monomer used to produce component (A). It is preferred that from about 10 to about 80 parts by weight, most preferably from about 25 to about 55 parts by weight, of the unsaturated monomer is added to the emulsion based on 100 parts by weight of the polydiorganosiloxane content thereof.

Suitable initiators to be used in this third step are those which are known to polymerize the unsaturated monomer (II). These include azo compounds, such as azobisisobutyronitrile and 2-2'-azobis(2-methylbutyronitrile), organic peroxides, such as acetyl peroxide, cumene hydroperoxide and benzoyl peroxide, and inorganic compounds such as potassium persulfate and ammonium peroxydisulfate, the azo compounds being preferred. The initiator is typically employed at a level of about 0.05 to about 0.2 parts by weight for each 100 parts by weight of the monomer (II) and is introduced as an organic solvent solution or, preferably, admixed with a portion of the monomer. In this polymerization step, the emulsion containing the initiator is preferably stirred at a temperature of about 60° to about 70° C. while the monomer is slowly added thereto, a typical addition period being in the range of 2 to 3 hours at the above noted temperatures, whereupon the resulting emulsion is heated for an additional at 2 to 3 hours.

The final step in the preparation of the composition of the invention involves the "recovery" of the above prepared particles from the emulsion. This can be accomplished by first coagulating the particles by any of the standard methods for breaking emulsions, such as freezing, freeze drying, spray drying or the addition of a salt such as calcium chloride. A favored method is one wherein the above formed emulsion is added, at room temperature, to a stirred excess of a water-soluble organic solvent such as acetone, ethylene glycol, ethanol or isopropyl alcohol, the later being preferred. The precipitated particles are then filtered and dried to form a crumb-like organic modified silicone rubber powder (B).

A composition of the present invention may then be prepared by thoroughly dispersing the organic modified silicone rubber powder (B) in polystyrene polymer (A) at such a level to produce compositions containing an overall polydiorganosiloxane having about 5 to about 50 parts by weight polystyrene (A). This mixing can be accomplished at elevated temperatures by any of the conventional methods used to disperse various components in thermoplastic resins. The temperature and other conditions to be used in such a mixing operation depend on the particular polymer selected and may be determined by routine experimentation by those skilled in the art. For example, the polystyrene polymer may be mixed according to this method at a temperature from about 180° C. to about 210° C. Alternatively, the organic modified silicone crumb rubber can be premixed with the polystyrene polymer, which is then fed to an extruder. Examples of suitable equipment for this purpose include such machines as twin screw extruders and single screw extruders, inter alia. In order to obtain optimum impact resistance in the modified PS polymer, sufficient silicone crumb is used so as to result in a polydiorganosiloxane content of about 10 to about 25 parts by weight for each 100 parts by weight of the polystyrene.

After components (B) and (A) are thoroughly mixed to provide a uniform blend, this composition can be further processed by conventional techniques, such as extrusion, vacuum forming, injection molding, blow molding or compression molding, to fabricate plastic parts which have significantly improved impact resistance over the unmodified polymer. It is also contemplated herein that the compositions of the invention may further contain fillers and other additives, including fillers and additives normally employed in conventional styrenic polymers of the art. It is preferred that these systems contain a glass fiber filler which further improves the mechanical properties of fabricated products, particularly when a silane coupling agent is also used, as is well known in the art.

The compositions find utility in various industrial applications where improved toughness is desired in a PS polymer system. Examples include electrical and electronic insulation components, such as motor, coil and transformer insulation; housings for various electrical and electronic equipment, such as machines and hand tools; structural members, such as foam board insulators; furniture; automotive components, such as engine and interior structural components; aircraft interior components; and freezer-to-oven cookware, inter alia.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

Example I

A 3-methacryloxypropyl functional polydimethylsiloxane emulsion was prepared by adding 1.6 g of stannous octanoate to 500 g of an inionically stabilized aqueous emulsion of polydimethylsiloxane having a solids content of about 70 per cent by weight, the emulsion particles being less than 800 nm in average diameter, and polymer having a weight average molecular weight of greater than 200,000 and the polymer also having silanol functional chain ends. With this polydimethylsiloxane emulsion was mixed 3.3 g of 3-methacryloxypropylethyldimethoxysilane which was added dropwise to the vortex of the vigorously stirred emulsion. Stirring was continued for 30 minutes after the addition of the silane, after which the reaction was allowed to continue for 24 hours. The emulsion was then adjusted to Ph 10 using 14 wt % aqueous ammonium hydroxide.

The above latex, 385 g, was then diluted to 30% solids by the addition of 440 ml of dionized $H_2O$. The emulsion was stirred and heated to 70° C. in a nitrogen flushed 2L reactor. A mixture of 50 ml of styrene, purified by passing over activated alumina gel, and 0.25 g of VAZO® 64 (available from duPont, Wilmington, Del.) (Azobisisobutyronitrile) was added dropwise to the reactor at a rate of 0.6 ml/min. After all the styrene was added to the reaction flask, the temperature was increased to 80° C. for two hours. The reaction was allowed to cool to room temperature overnight while stirring.

The emulsion was then coagulated by stirring into 5 liters of isopropyl alcohol. The coagulated solids were separated from the alcohol by filtration and the resulting composition was dried in a vacuum oven at 50° C. for 24 hours.

The above silicone rubber powder contained 84% by weight polydimethylsiloxane and was used to modify a general purpose polystyrene (PS) polymer (STYRON™ 685D available from Dow Chemical, Midland, Mich.). A Haake System 90 TW100 extruder (Haake/Fisons Instruments, Paramus, N.J.) was used to form a composite containing various amounts of polydimethylsiloxane as shown in Table 1. The extruder conditions employed were: feed zone 1 temperature=180° C.; mixing zone 2 temperature= 210° C.; mixing zone 3 and exit temperature–210° C.; screw speed=50 revolutions per minute (rpm); die=⅛ inch diameter strand die.

The extrudate from the above mixing operation was cooled, chopped into pellets, dried for 2.5 hours at 100° C. and fabricated into impact test bars measuring ½×5× ⅛ inch using a Boy model 15S screw-type injection molding machine (Boy Machine Corp., Exton, Pa.). The molding parameters used were: Mixing zone 1 temperature=400° F.; Mixing zone 2 temperature= 465° F.; Nozzle zone 3 dial setting=52; Mold temperature=110° F.; Injection pressure= 1,800 psi; Screw discharge set point=3.0; Mold clamp pressure=3,700 psi; Shot size dial=36; Mold time= 30 seconds.

The above described impact test bars were notched and tested for Izod impact strength according to ASTM D 256. The values for the different compositions are given in Table 1.

TABLE 1

| Parts of PDMS in PS | Notched Izod Impact Strength (ft-lb/in) |
|---|---|
| 0 | 0.23 |
| 12 | 1.30 |
| 15 | 2.05 |
| 17.5 | 2.37 |

Example II

A silicone rubber powder was produced according to the methods outlined in Example I, wherein 428 parts of the anionically stabilized polydimethylsiloxane emulsion described in Example I was crosslinked with 2 parts of stannous octoate and 4.8 parts of methacryloxypropyltrimethoxysilane. The resulting emulsion was aged 15 minutes at room temperature, diluted with 400 parts of water and aged overnight. Five hundred parts of water were then added and 0.1 part of AIBN in 3 cc of styrene were mixed in at a temperature of 50° C. and under a nitrogen purge. Styrene monomer was then introduced over about a four hour period as the temperature of the emulsion was maintained between 50° and 65° C. (total styrene added=100 parts). After standing at room temperature for two days, silicone rubber powder was recovered by pouring the above emulsion into isopropyl alcohol, washing the coagulated solids followed by drying in ambient air. The silicone rubber powder had a measured polydimethylsiloxane content of 74.3%.

Various proportions of the above harvested powder were used to modify general purpose PS, as described in Example 1. Impact resistance of the molded and notched test bars derived therefrom is presented in Table 2, wherein the first column indicates the calculated parts by weight of polydimethylsiloxane present in the modified PS system per 100 parts by weight of polystyrene polymer.

TABLE 2

| Parts Polydimethylsiloxane Per 100 Parts of Polystyrene Polymer | Percent Polydimethylsiloxane in Modified Polystyrene Polymer | Notched Izod Impact Strength (ft-lb/inch) |
|---|---|---|
| 0 (Control) | 0 | .23 |
| 11 | 10 | 1.21 |
| 15 | 13 | 1.35 |
| 18 | 15 | 2.25 |
| 21 | 17 | 1.96 |
| 25 | 20 | 2.14 |
| 33 | 25 | 1.68 |

Comparison of the impact values in Table 2 to those in Table 1 shows that the compounds prepared in accordance with those of the present invention as seen in Table 1 achieve comparable, if not superior impact properties over the crosslinked compounds of the prior art seen in Table 2. For example, 17.5 parts of the polydimethylsiloxane prepared in Example 1 showed an impact strength of 2.37 ft-lb/in, greater than the impact strength of the polydimethylsiloxane prepared in Example 2, where 18 parts of polydimethylsiloxane showed an impact strength of 2.25 ft-lb/in. The polyorganosiloxanes of the present invention therefore provide equivalent or improved impact properties, over the prior art, while also offering the processing benefits of a silicone gum.

We claim:

1. A composition comprising a blend of:

(A) a polystyrene polymer; and (B) a silicone crumb rubber powder uniformly dispersed in said polystyrene polymer, said silicone crumb rubber prepared by the steps comprising:

(I) reacting a preformed aqueous polydiorganosiloxane emulsion comprising water, a surfactant, and a plurality of silanol-terminated polydiorganosiloxane molecules, with a grafting silane in the presence of an organotin catalyst to form a non-crosslinked telechelic emulsion polymer, wherein said grafting silane has the formula:

$RQSi(X)_2$ where

X is a hydrolyzable group,

Q is an unsaturated organic functional group,

R is Q, or a saturated monovalent hydrocarbon group of from one to six carbon atoms, and (II) thereafter co-polymerizing an unsaturated monomer with said non-crosslinked telechelic emulsion polymer formed in step (I) to form particles therefrom; and (III) recovering the particles resulting from step (II), said composition containing from 5 to 50 parts by weight of said polydiorganosiloxane for each 100 parts by weight of said polystyrene polymer.

2. The composition according to claim 1, wherein said polydiorganosiloxane is a polydimethylsiloxane which is terminated with a silanol group at each end of its molecule and said unsaturated monomer is a styrenic monomer.

3. The composition according to claim 2, wherein said silane is represented by the formula $R'Q'Si(OR')_2$ in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula HCl·ZN—CH₂CH₂—N—CH₂CH₂CH₂— and a group of the formula HCl·ZN(H)—CH₂CH₂—N(H)—CH₂CH₂CH₂—, wherein Z is

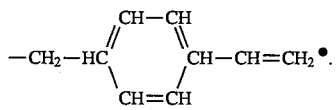

4. The composition according to claim 3, wherein said curing catalyst is selected from the group consisting of a tin (II) carboxylate and a dialkyl tin (IV) carboxylate.

5. The composition according to claim 4, wherein said curing catalyst is stannous octoate.

6. The composition according to claim 5, wherein said silane is gamma-methacryloxypropylmethyldimethoxysilane.

7. The composition according to claim 1, wherein an initiator is added during said co-polymerization of step III.

8. The composition according to claim 7, wherein said initiator is azobisisobutyronitrile.

9. A silicone rubber powder prepared by the steps comprising:

(I) reacting a preformed aqueous polydiorganosiloxane emulsion comprising water, a surfactant, and a plurality of silanol-terminated polydiorganosiloxane molecules, with a grafting silane in the presence of an organotin catalyst to form a non-crosslinked telechelic emulsion polymer, wherein said grafting silane has the formula:

RQSi(X)₂ where

X is a hydrolyzable group,

Q is an unsaturated organic functional group,

R is Q, or a saturated monovalent hydrocarbon group of from one to six carbon atoms, and (II) thereafter co-polymerizing an unsaturated monomer with said non-crosslinked telechelic emulsion polymer formed in step (I) to form particles therefrom; and (III) recovering the particles resulting from step (II).

10. The composition according to claim 9, wherein said polydiorganosiloxane is a polydimethylsiloxane which is terminated with a hydroxyl group at each end of its molecule and said unsaturated monomer is a styrenic monomer.

11. The composition according to claim 10, wherein said silane is represented by the formula R'Q'Si(OR')₂ in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula HCl·ZN—CH₂CH₂—N—CH₂CH₂CH₂— and a group of the formula HCl·ZN(H)—CH₂CH₂—N(H)—CH₂CH₂CH₂—, wherein Z is

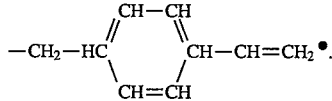

12. The composition according to claim 11, wherein said curing catalyst is selected from the group consisting of a tin (II) carboxylate and a dialkyl tin (IV) carboxylate.

13. The composition according to claim 12, wherein said curing catalyst is stannous octoate.

14. The composition according to claim 13, wherein said silane is gamma-methacryloxypropylmethyldimethoxysilane.

15. The composition according to claim 9, wherein an initiator is added during said co-polymerization of step III.

16. The composition according to claim 7, wherein said initiator is azobisisobutyronitrile.

17. A method of using a silicone crumb rubber to modify a polystyrene polymer, said method comprising blending a polystyrene polymer and a silicone crumb rubber, said silicone crumb rubber being prepared by the steps comprising (I) reacting a preformed aqueous polydiorganosiloxane emulsion comprising water, a surfactant, and a plurality of hydroxyl-terminated polydiorganosiloxane molecules, with a grafting silane in the presence of an organotin catalyst to form a non-crosslinked telechelic emulsion polymer, wherein said grafting silane has the formula:

RQSi(X)₂ where

X is a hydrolyzable group,

Q is an unsaturated organic functional group,

R is Q, or a saturated monovalent hydrocarbon group of from one to six carbon atoms, and (II) thereafter co-polymerizing an unsaturated monomer with said non-crosslinked telechelic emulsion polymer formed in step (I) to form particles therefrom; and (III) recovering the particles resulting from step (II), said composition containing from 5 to 50 parts by weight of said polydiorganosiloxane for each 100 parts by weight of said polystyrene polymer.

18. The method according to claim 15, wherein said polydiorganosiloxane is a polydimethylsiloxane which is terminated with a silanol group at each end of its molecule and said unsaturated monomer is a styrenic monomer.

19. The method according to claim 16, wherein said grafting silane is represented by the formula:

R'Q'Si(OR')₂ in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula HCl·ZN—CH₂CH₂—N—CH₂CH₂CH₂— and a group of the formula HCl·ZN(H)—CH₂CH₂— N(H)—CH₂CH₂CH₂—, wherein Z is

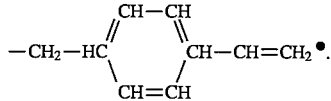

20. The method according to claim 19, wherein said curing catalyst is selected from the group consisting of a tin (II) carboxylate and a dialkyl tin (IV) carboxylate.

21. The method according to claim 20, wherein said curing catalyst is stannous octoate.

22. The method according to claim 21, wherein said silane grafting silane is gammamethacryloxypropylmethyldimethoxysilane.

23. The method according to claim 22, wherein said component (A) is atactic polystyrene.

24. The method according to claim 23, wherein said component (A) is syndiotactic polystyrene.

25. The composition according to claim 17, wherein an initiator is added during said co-polymerization of step III.

26. The composition according to claim 17, wherein said initiator is azobisisobutyronitrile.

27. A composition comprising a blend of:
(A) a polystyrene polymer; and
(B) a silicone crumb rubber powder uniformly dispersed in said polystyrene polymer, said silicone crumb rubber comprising:
(I) a non-crosslinked telechelic emulsion polymer formed from a preformed aqueous polydiorganosiloxane emulsion comprising water, a surfactant, and a plurality of silanol-terminated polydiorganosiloxane molecules,
an organotin catalyst, and
a grafting silane having the formula:

$$RQSi(X)_2$$

where
X is a hydrolyzable group,
Q is an unsaturated organic functional group,
R is Q, or a saturated monovalent hydrocarbon group of from one to six carbon atoms; and
(II) an unsaturated monomer, wherein said composition contains from 5 to 50 parts by weight of said polydiorganosiloxane for each 100 parts by weight of said polystyrene polymer.

28. The composition according to claim 27, wherein said polydiorganosiloxane is a polydimethylsiloxane which is terminated with a hydroxyl group at each end of its molecule and said unsaturated monomer is a styrenic monomer.

29. The composition according to claim 28, wherein said silane is represented by the formula $$R'Q'Si(OR')_2$$

in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula $$HCl \cdot ZN-CH_2CH_2-N-CH_2CH_2CH_2- \text{ and a group}$$

of the formula $HCl \cdot ZN(H)-CH_2CH_2- N(H)- CH_2CH_2CH_2-$, wherein Z is

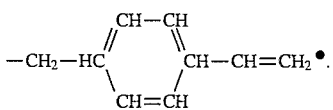

30. The composition according to claim 29, wherein said curing catalyst is selected from the group consisting of a tin (II) carboxylate and a dialkyl tin (IV) carboxylate.

31. The composition according to claim 30, wherein said curing catalyst is stannous octoate.

32. The composition according to claim 31, wherein said silane is gamma-methacryloxypropylmethyldimethoxysilane.

33. The composition according to claim 27, wherein said composition includes an initiator.

34. The composition according to claim 33, wherein said initiator is azobisisobutyronitrile.

* * * * *